United States Patent [19]
Thiele

[11] 3,742,437
[45] June 26, 1973

[54] SIGNAL TRANSMISSION SYSTEM
[75] Inventor: Rudolf Thiele, Bremen, Germany
[73] Assignee: Fried-Krupp Gesellschaft mit Beschrankter Haftung, Essen, Germany
[22] Filed: Feb. 29, 1972
[21] Appl. No.: 230,291

[30] Foreign Application Priority Data
Mar. 26, 1971 Germany.................. P 21 14 675.8

[52] U.S. Cl...................... 340/3 D, 340/5 R, 343/8
[51] Int. Cl............................................... G01s 9/66
[58] Field of Search................ 340/3 R, 3 D, 3 FM, 340/5 R; 343/8, 9

[56] References Cited
UNITED STATES PATENTS
3,436,721   4/1969   Farr................................... 340/3 D

*Primary Examiner*—Richard A. Farley
*Attorney*—George H. Spencer et al.

[57] ABSTRACT

A frequency keyed signal system having a transmitter which generates and transmits coded frequency keyed signals having a sequence of intervals of identical time durations. A plurality of different frequencies are utilized, each of the frequencies being a respective whole positive number multiple of a fundamental frequency. A receiver responsive to the transmitted coded frequency keyed signals is provided. The receiver includes a frequency divider responsive to the received signals. The frequency divider has a variable dividing ratio and produces on its output an output signal of the fundamental frequency with any Doppler shift as may be present. A frequency analyzer is coupled to the output of the frequency divider and is responsive to its output signal.

6 Claims, 14 Drawing Figures

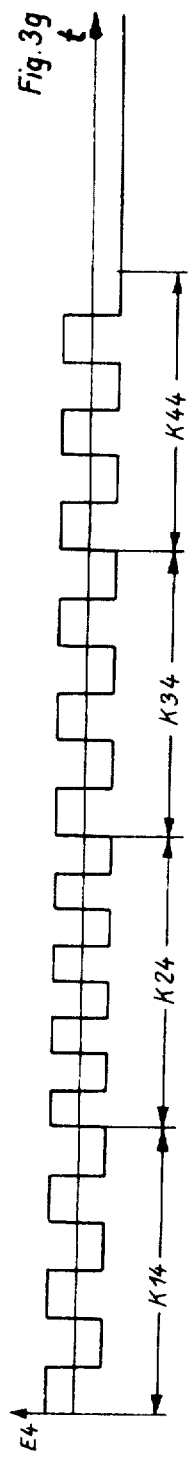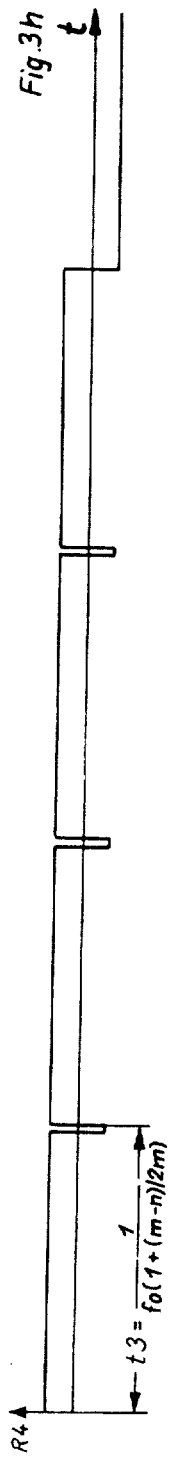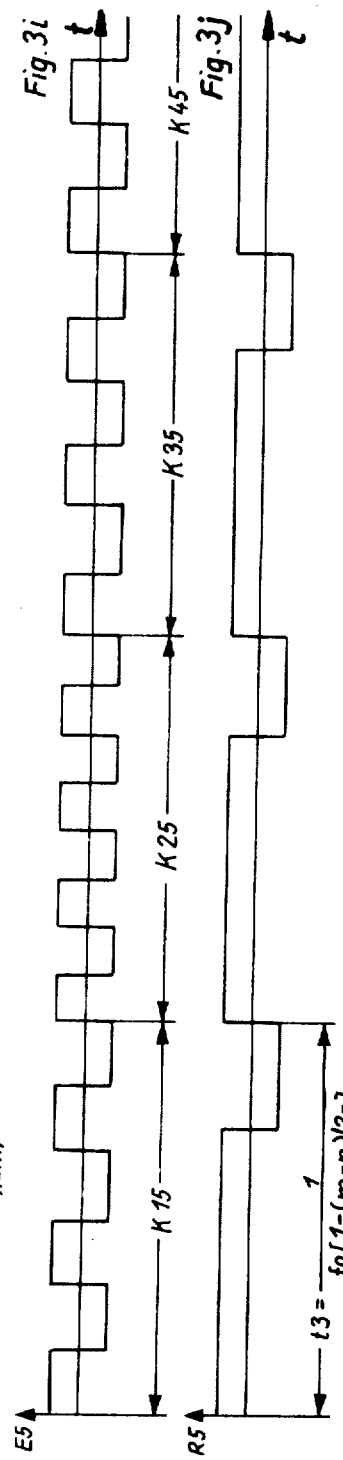
Fig. 3g–3j

SIGNAL TRANSMISSION SYSTEM

BACKGROUND OF THE INVENTION

This invention relates to a frequency keyed signal transmission system. The present invention, more particularly, relates to a frequency keyed signal system, which includes an apparatus for determining a Doppler shift in received signals originating from transmitted signals which have been frequency keyed according to any desired code and which consist themselves of a sequence of intervals of the same duration (coding elements) with oscillations whose frequencies can be given differently and which are a whole positive number multiple of a fundamental frequency.

No method has thus far become known which permits simple determination, at the receiving end, of Doppler shifts independent of the code used at the transmitting end for frequency keying. It is conceivable to produce a receiving device from a plurality of parallel processing channels for the ocrresponding number of different frequencies with their Doppler shifts of interest. In view of the normally required resolution of, for example, more than 100 values in the Doppler shifts, such a circuit would, however, become very complicated. As a practical matter, circuit arrangements for determining Doppler shifts in received frequency keyed signals consequently have been until now limited to those specially adapted to a given code.

SUMMARY OF THE INVENTION

It is an object of the present invention to provide in a frequency keyed signal system an arrangement which permits the determination of all Doppler shifts in the received signals with a conventional frequency analyzer.

It is another object of the present invention in a frequency keyed signal system to provide an arrangement which permits the determination of all Doppler shifts with a frequency analyzer tuned only to a fundamental frequency.

It is a further object of the present invention in a frequency keyed signal system to provide an arrangement which permits transmission of the frequency keyed signals in an arbitrary code while effecting the determination of all Doppler shifts with a simple inexpensive circuit.

It is an additional object of the present invention in a frequency keyed signal system to provide an arrangement which permits intentionally changing of the code used without requiring, at the receiving end, any changes or adjustments of the circuit which determines all Doppler shifts.

It is yet a further object of the present invention in a frequency keyed signal system to provide an arrangement which permits the determination of all Doppler shifts and utilizes a code according to which the coding elements of the transmitted signals are frequency keyed according to any arbitrary code which can be intentionally changed whenever required without requiring modifications at the receiving end of a frequency analyzer of given construction.

The above-mentioned objects, as well as others which will become apparent from the text below, are accomplished according to the present invention in a frequency keyed signal system by providing a transmitter which transmits coded frequency keyed signals which have identical time durations. The frequencies of the transmitted signals differ from each other and are respective whole positive number multiples of a fundamental frequency. A receiver which is responsive to the transmitted coded frequency signals is provided. The receiver has a frequency divider having a variable dividing ratio. The frequency divider produces an output signal of the fundamental frequency with possibly present Doppler shift in response to the received coded frequency signals. A frequency analyzer is coupled to the output of the frequency divider and is responsive to its output signal.

The present invention in one practical embodiment is characterized in that at the transmitting end the multiples of the fundamental frequencies in the coding elements are whole positive numbers and a frequency divider with a variable dividing ratio is connected to the receiving arrangement, a frequency analyzer being connected to the frequency divider. The frequency analyzer may be a fixed filter bank or a real time analyzer.

Of special interest technically is first of all a realization of this solution for signals having coding elements which were frequency keyed according to any desired binary code. These signals have coding elements, according to their binary coded value, of identical time duration and one of two possible frequencies which are positive whole number multiples of the fundamental frequency, a certain number of complete oscillations of the one or the other frequency occurring during the duration of each coding element. The received signals are fed to a frequency divider which need reduce only two frequencies, according to the binary code, with their possibly present Doppler shifts to a common frequency, i.e., a fundamental frequency.

According to a feature of the present invention, the simplest form of a frequency dividing circuit can always be used, i.e., a monostable multivibrator with a filter tuned to the fundamental frequency connected thereto. The dividing ratio of this frequency divider changes in jumps depending on the frequency at its input.

The monostable multivibrator is started, for example, during the first positive zero passage of the oscillations of a coding element and returns to the stable switching state after a given period of dwell for the astable state which period is selected to be shorter than the time duration of a coding element so that — under consideration of the recovery time typical for this circuit — it can again be started at the next zero passage of a given orientation.

At the output of the monostable multivibrator there appears a series of rectangular pulses of a high keying ratio which, as can be proven by a Fourier analysis, contains only the fundamental frequency with a plurality of superimposed higher harmonics if at the input of the monostable multivibrator oscillations are present at a frequency which is a multiple of the fundamental frequency. The filter connected to the monostable multivibrator is a lowpass filter, or a bandpass filter tuned to the fundamental frequency, which suppresses the higher harmonics. A subsequent frequency analysis of these signals is possible in a known manner, for example, by means of a single conencted filter bank or a real time analyzer.

A shift in the received frequencies with respect to the transmitted frequencies caused by the Doppler effect, the percentage of the Doppler shift being proportional to the relative speed between observer and object and being the same for each of the transmitted frequencies, corresponds to an identical change in the time duration of the individual coding elements in the received signals with respect to those in the transmitted signals. For example, for a positive Doppler shift, the received frequencies always lie correspondingly higher than the transmitted frequencies so that the time duration of the individual coding elements of the received signals is shorter than that of the transmitted signals. Due to the constant period of dwell of the monostable multivibrator in its astable state, this shorter time duration of the individual coding elements results in a shortening of the time in which the monostable multivibrator remains in its stable state and consequently in a reduction of the period duration of the rectangular pulses at the output from the monostable multivibrator. The lowest frequency of the rectangular pulse train filtered out by the connected low pass filter or, preferably, bandpass filter, which is equal to the reciprocal value of their period duration, is increased with respect to the original fundamental frequency by the same percentage of Doppler shift as the received frequencies. With subsequent frequency analysis this Doppler shift is determined.

For a negative Doppler shift of the received frequencies, the time duration of the individual coding elements in the received signals is increased and thus also the time in which the monostable multivibrator remains in its stable switching state. The period duration of the rectangular pulses at the output from the monostable multivibrator is now greater. The reciprocal value of the period duration of the rectangular pulses is equal to the fundamental frequency reduced by the fundamental frequency multiplied by the Doppler shift.

The transmission range of the bandpass filter is adapted to the Doppler frequency range of interest.

With the solution of the present invention there is provided for the first time an improvement in a frequency keyed system which permits a frequency analysis of Doppler affected frequencies with only a single filter bank or a single real time analyzer, where the transmitted signals may have coding elements which were frequency keyed according to any desired code, which can be changed without modifying the Doppler shift determining arrangement at the receiving end.

The transmitted coding elements each have the same time duration and complete oscillations at multiples of a fundamental frequency. A frequency analysis of the received signals can be effected in a transmitting-receiving frequency keyed system with a continuous change in the code employed, without there being required a large number of filter banks or other frequency analyzers as this has previously been necessary.

BRIEF DESCRIPTION OF THE DRAWINGS

FIGS. 3a-3j show time diagrams of signals from the system of FIG. 2 for a binary code consisting of four coding elements.

DESCRIPTION OF THE PREFERRED EMBODIMENTS

The embodiments of the present invention which will be discussed in detail below are provided particularly for use in active sonar systems. The present invention, however, is also significant for the entire range of the transmitting and receiving art in the data transmission field, as for example in the ranging and navigation art, if at the transmitting end signals from frequency keyed coding elements of the same time duration and any desired code are to be evaluated at the receiving end with respect to their frequency. Only in the case of the reflected beam ranging art are the transmitting end and the receiving end at the same location. When the transmitting end and the receiving end are separated, the receiver is able, with a knowledge of the fundamental frequency employed in the transmitter, to determine the relative speed between himself and the transmitter independently of the code used in the transmitter.

Figure 1:
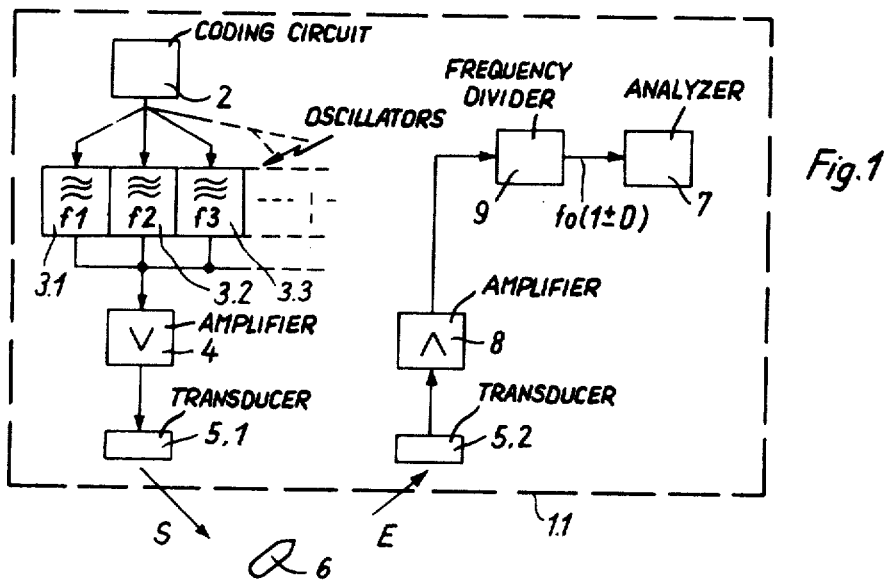
FIG. 1 is a block circuit diagram of a frequency keyed signal system for signals with frequency keyed coding elements in any desired code according to an embodiment illustrating the present invention.

As shown in FIG. 1, a frequency keyed signal system is generally designated 1.1. According to any desired coding, a coding circuit 2 is operatively arranged to control a plurality of oscillators $3.1, 3.2, 3.3 \ldots$ which feed a plurality of signals at frequencies $f1, f2, f3, \ldots$, which are multiples of a fundamental frequency $f0$, via a driving amplifier 4 to a transmitting transducer 5.1 in any desired sequence with the same time duration for all of them. As illustrated, the transmitting transducer 5.1 radiates a transmitted signal S. The transmitted signal S thus consists of coding elements K1, K2, K3, ... which are frequency keyed according to a given code and whose time duration is the same for all of them.

A received signal E reflected from an object 6 is received by a receiving transducer 5.2 With a relative movement of the object 6 with respect to the frequency keyed signal system 1.1, the reflected received signal E has frequencies, due to the Doppler effect, which are shifted with respect to the transmitted frequencies $f1, f2, f3, \ldots$ by their associated Doppler frequency Df1, Df2, Df3, .... The percentage value of the Doppler shift D is known to be the same for each one of the transmitted frequencies $f1, f2, f3, \ldots$ since the Doppler shift D is proportional to the relative speed between the transmitting-receiving frequency keyed signal system 1.1 and the object 6. This Doppler shift D is to be determined, in spite of a succession of different received frequencies $f1(1\pm D), f2(1\pm D), f3(1\pm D), \ldots$ and independent of the selected code, with a conventional frequency analyzer 7 tuned to a center frequency, i.e., the fundamental frequency $fo$. For this purpose, the received signals E received by the receiving transducer 5.2 are switched, if required upon amplification in an amplifier 8, in accordance with the present invention, to a frequency divider 9 whose dividing ratio always sets itself, in dependence on the received frequency, so that the respective received frequency $f1(1\pm D), f2(1\pm D), f3(1\pm D), \ldots$ is reduced to the fundamental frequency $f0$ with the Doppler shift D contained therein, i.e., to the frequency $fo(1\pm D)$. The output signal from the frequency divider 9 is fed to the conventional frequency analyzer 7 to determine the Doppler shift D. The analyzer 7 may be, for example, a filter bank, a real time analyzer or the like.

The transmitting-receiving frequency keyed system 1.1, as illustrated, is used practically as a reflected beam ranging device, but it is just as suited for a transmitting and/or purely receiving operation if its transmitting portion is spatially separated from its receiving portion.

Figure 2:
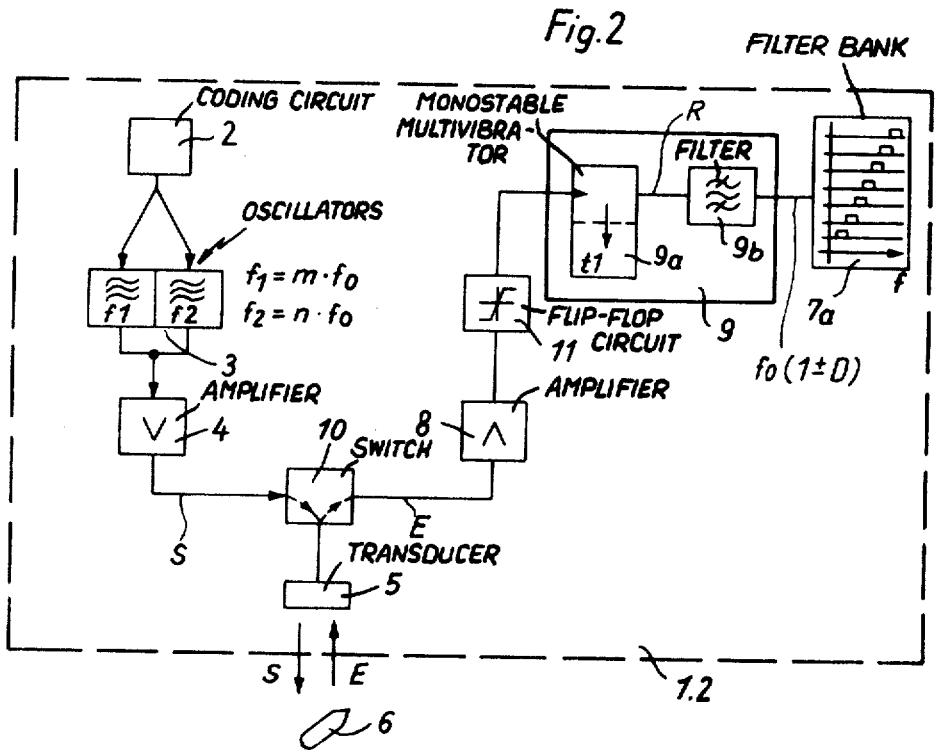
FIG. 2 is a block circuit diagram of a reflected beam ranging system using transmitted signals with frequency keyed coding elements in any desired binary code according to a second embodiment illustrating the present invention.

As illustrated in FIG. 2, a frequency keyed signal system, of a reflected beam ranging type, is generally designated 1.2. Transmitted signals S whose coding elements K are frequency keyed according to any desired binary code are produced by the transmitter portions of the system 1.2. The exemplary embodiment shown in FIG. 2 is based on a multiple-digit binary code whose two possible bit values are represented by two frequencies $f1 = m \cdot f0$, $f2 = n \cdot f0$, $n$ and $m$ being positive whole numbers and $f0$ being the fundamental frequency.

To beam out the transmitted signals S and to receive the reflected received signals E a single transducer 5, in the system of FIG. 2, is employed as this is often the custom in the sonar art. The signal paths for producing the transmitting signals S and for evaluating the incoming signals E are separated by a switch 10 of conventional construction.

The received signals E which are to be reduced to a single frequency $f0(1\pm D)$ by a frequency divider 9 so that frequency analysis is made possible with only one conventional filter bank 7a. For this purpose the received signals E are fed, possibly via a receiving amplifier 8, to a potential controlled flip-flop circuit 11 at whose output a rectangular sequence of constant amplitude pulses appears according to the received frequencies $m \cdot f0 \cdot (1\pm D)$. The potential controlled flip-flop circuit 11 is connected to the frequency divider 9 which includes a monostable multivibrator 9a with a bandpass filter 9b connected thereto, which frequency divider 9 reduces all the received frequencies to the frequency $f0 (1\pm D)$. The frequency divider 9 is connected at its output with a frequency analyzer constructed in the form of a filter bank 7a. A real time analyzer could be substituted for the filter bank 7a.

Figures 3A, 3B, 3C, 3D, 3E, 3F:
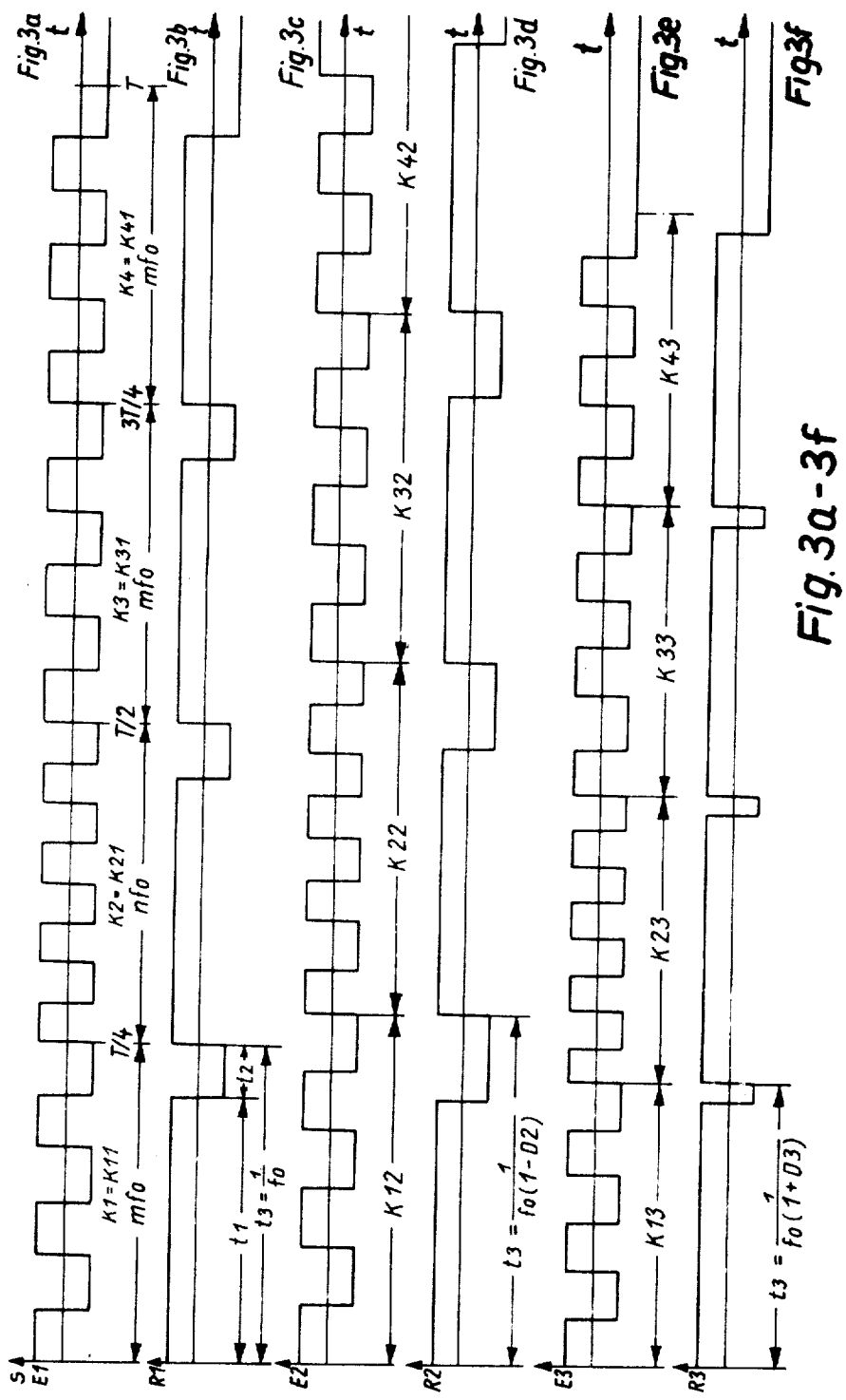

In order to describe the operation of this reflected beam ranging device 1.2 of FIG. 2, reference is made to FIGS. 31–3j. Time diagrams of the transmitted signal S (FIG. 3a), a plurality of received signals E1, E2, .. . E5 (FIGS. 3a, 3c, 3e, 3f, 3i) and the associated rectangular pulse trains R1, R2, . . . R5 at the output (FIGS. 3b, 3d, 3f, 3h, 3j) of the monostable multivibrator 9a are shown.

FIG. 3a shows the example of a time curve of a transmitted signal S of a frequency keyed binary word 1011 constituting the four coding elements K1, K2, K3 and K4 of the transmitted signal, "1" being characterized by the coding element K of frequency $f1 = m \cdot f0$ and "0" being characterized by the coding element K of frequency $f2 = n \cdot f0$. For reasons of simplicity the time curve is not shown as a sinusoidal oscillation but rather as a rectangular train. The transmitted signal S has a total duration T. All four coding elements have the same time duration, i.e., T/4.

The time sequence of a received signal E1 which is not affected by Doppler shift is identical with the transmitted signal S. The potential controlled flip-flop circuit 11 converts the received signal E1 into a rectangular sequence which is similar to that shown in FIG. 3a.

This rectangular sequence E1 is fed to the monostable multivibrator 9a of the frequency divider 9. The monostable multivibrator 9a is flipped into its astable switching state by the first positive edge of the first coding element K11. Its period of dwell in the astable switching state is less than the time duration of a coding element K and is $t1$ (FIG. 3b). Time $t1$ is also assumed to include its typical recovery time which is negligibly small compared to the period of dwell in the astable state. Then the monostable multivibrator 9a flips back to its stable state until it is flipped back to its astable state by the first positive edge of the second coding element K21 with oscillations at frequency $f2$. Its period duration $t3$ is here identical with the time duration T/4. During the time $t3 - t1 = t2$ the monostable multivibrator 9a is in its stable state. In FIG. 3b this signal sequence appearing at the output of the monostable multivibrator 9a is shown as a rectangular pulse train R1.

The time duration of coding elements K of the transmitted and received signals is thus identical. Each first positive edge of each coding element K flips the monostable multivibrator 9a into the astable state; i.e., the period duration of this rectangular pulse train R1 is exactly equal to the time duration of the coding elements. Since complete oscillations of multiples of the fundamental frequency $f0$ just fit into time period T/4 the frequencies $f1 = m \cdot f0$ and $f2 = n \cdot f0$ are each divided by the monostable multivibrator 9a by their multiple $m$ or $n$, respectively. The rectangular pulse train R1 at the output of the monostable multivibrator 9a thus shows a repetition frequency $f0$. Its period duration $t3$ is exactly equal to $t3 = 1/f0 = T/4$. If this rectangular pulse train R1 with the period duration $t3 = 1/f0$ is fed to a bandpass filter 9b with a center frequency which is equal to the fundamental frequency $f0$, a sinusoidal oscillation at frequency $f0$ is obtained at the output of this bandpass filter 9b. The output signal from bandpass filter 9b is subjected to frequency analysis in the connected filter bank 7a.

If the frequencies of the received signal E cannot be divided without a remainder to result in the fundamental frequency $f0$, the period duration $t3$ of the rectangular pulse train changes at the output of the monostable multivibrator 9a in the same manner as the duration of the coding elements K of received signals E. FIG. 3c shows the time sequence of a rectangular train associated to a received signal E2 at the output of the flip-flop circuit 11, whose frequencies are shifted by the same negative Doppler shift percentage D2. The time duration of the docing elements K12, K22, . . . K42 has become longer compared to the time duration of the transmitted coding elements K11, . . . K41. At the output of the monostable multivibrator 9a there now appears a rectangular pulse train R2 according to FIG. 3d. Its period duration $t3$, i.e., the time between two moments of flipping into its astable state, has become longer in the same manner as the time duration of the individual received coding elements K12 . . . K42. It is $t3 = 1/f0(1-D2)$. The time in which the monostable multivibrator 9a remains in its astable state, i.e., time $t1$, remains constant, since it is determined by the circuit parameters of the monostable multivibrator 9a. Time $t2$, in which the multivibrator 9a remains in its stable state, is longer due to the Doppler shift D2 since it will be terminated only when the next positive edge of the rectangular pulse train again flips the monostable multivibrator 9a into its astable state.

At the output of bandpass filter 9b there appears a sinusoidal oscillation at frequency $f0 \cdot (1-D2)$ which is evaluated in the filter bank 7a.

FIG. 3e shows the time sequence of a rectangular train belonging to a received signal E3 with a positive Doppler shift D3 of the transmitted frequencies $m \cdot f0$ and $n \cdot f0$. At the output of the monostable multivibrator 9a there now appears a rectangular pulse train R3 according to FIG. 3f, whose period duration $t3$ is shorter than T/4, since the time duration of the received coding elements K13 ... K43 is shorter than the time duration of the transmitted coding elements K13 ... K41. The fundamental frequency of the rectangular pulse train R2 has the frequency $f0 \cdot (1+D3)$ which appears at the output of the bandpass filter 9b.

FIG. 3g shows the time sequence of a rectangular train belonging to a received signal E4 whose coding elements K14 ... K44 have a duration $t1$, which is equal to the period of dwell of the monostable multivibrator 9a in its astable state plus its s typical recovery time, as shown in FIG. 3h. With a further increase in the frequency of the received signal E4 by an even larger positive Doppler shift the moment of flipping for the monostable multivibrator 9a into the astable state is no longer effected by each first positive edge of the oscillations of a received coding element K but rather by the next following one so that the period duration $t3$ no longer equals the time duration of the received coding element K. An unambiguous determination of this Doppler shift is no longer possible since it produces a period duration $t3$ which could also correspond to a negative Doppler shift.

A negative Doppler shift which can be maximally evaluated with a given period of dwell $t1$ for the astable state is shown in the rectangular train according to FIG. 3i which is associated to a received signal E5. At the output of the monostable multivibrator 9a there is produced a rectangular pulse train R5 according to FIG. 3j. With a further reduction of the received frequencies the point of flipping for the monostable multivibrator 9a into the astable state would also no longer be determined by each first positive edge of the oscillations of a received coding element K but rather the monostable multivibrator 9a would be flipped twice into the astable state already during the first received coding element K.

Figure 4:
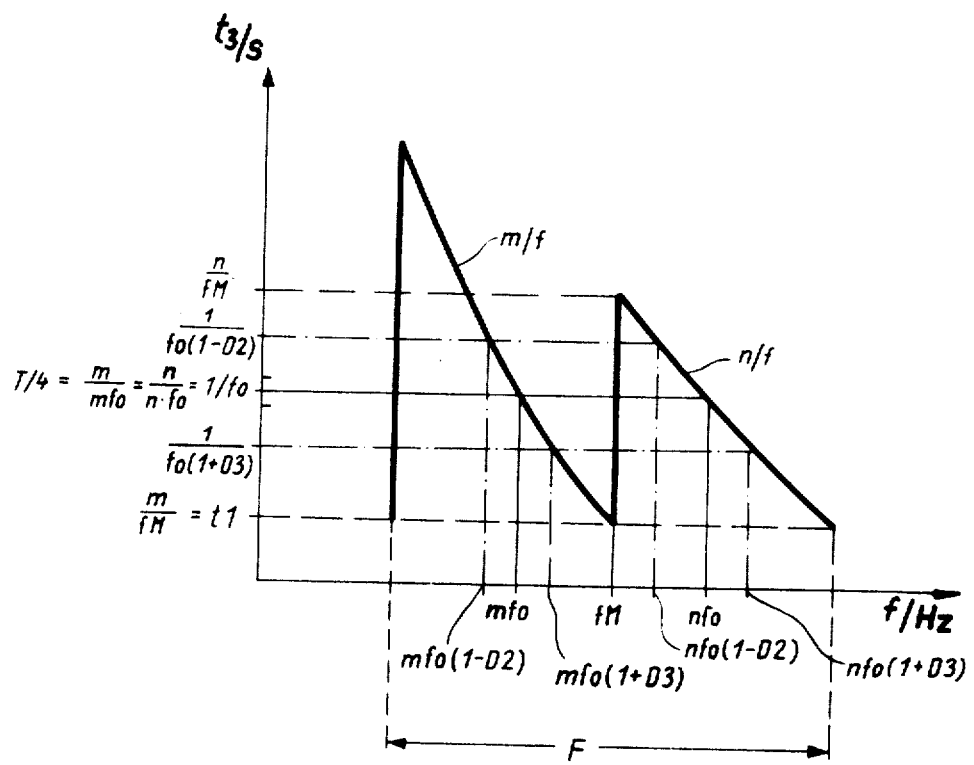
FIG. 4 is a graphical representation of period durations of a signal from the system of FIG. 2 over a frequency range of interest with a binary code being employed at the transmitting end.

FIG. 4 shows the function of the monostable multivibrator 9a as a frequency divider 9 in an operating characteristic. The period duration $t3$ of the rectangular pulse train R is plotted in dependence on the frequency $f$ of the rectangular train at the input of the monostable multivibrator 9a in a frequency range F of interest. The shortest period duration $t3$ of the rectangular pulse train is determined by the period of dwell $t1$ of the monostable multivibrator 9a in its astable switching state. The recovery time which is typical for each monostable multivibrator is assumed to be contained in time $t1$. When two transmitting frequencies $m \cdot f0$ and $n \cdot f0$ are used, $m$ and $n$ being whole positive numbers and $m$ being smaller than $n$, the shortest period duration $t3 = t1$ is determined by the reciprocal value of the arithmetic mean $fM$ of the transmitting frequencies, which is multiplied with the multiple $m$. The arithmetic mean $fM$ is calculated at $f0 \cdot (m+n)/2$. If the rectangular train fed to monostable multivibrator 9a has a frequency $f$ less than $fM$, the time $t3$ becomes longer. If the frequency $f$ is exactly $m \cdot f0$, the period duration $t3$ = $m/m \cdot f0$ is equal to the reciprocal value of the fundamental frequency $f0$ and thus the time duration T/4 of a transmitted coding element K.

The period duration $t3$ drops hyperbolically with a further increasing frequency with an increase which is equal to the multiple $m$, up to a received frequency $m \cdot f0 \ (1+D3_{max})$ which is equal to the arithmetic mean $fM$ and has the associated period duration $t3 = m/fM = t1$. This case is shown in FIG. 3g. The oscillations of the first received coding element K14 all fall within the period of dwell of the monostable multivibrator in its astable state plus its typical recovery time, i.e., within time $t1$. The first positive edge of the oscillations of the second coding element K24 whose frequency $n \cdot f0(1+D3_{max})$ is higher than that of the first coding element K14, restarts at once the monostable multivibrator 9a. The higher number of oscillations of the second coding element K24 are again completely terminated after the period of dwell in the astable state plus the recovery time, i.e., after the time $t1$, so that the first positive zero passage of the oscillations of the received third coding element K34 restart the monostable multivibrator 9a after the time $t1$.

A further borderline case is shown in FIG 3i. Oscillations in the second coding element K25 of the received frequency $n \cdot f0 \ (1-D2_{max})$, which is infinitesimally larger than the arithmetic mean $fM$ for the transmitted frequency $m \cdot f0$ and $n \cdot f0$ switch the monostable multivibrator 9a into its astable state with the first positive edge of their oscillations. After the period of dwell $t1$ the monostable multivibrator 9a falls back into its stable state after the positive edge of the last oscillation in the second coding element K25 had just risen before. Only after the last, the $n^{th}$ oscillation will the monostable multivibrator 9a be switched back into its astable state with the next positive edge of the first oscillation of the third coding element K35. The period duration of this rectangular pulse train R5 is $t3 = n/fM$. For frequencies which are greater than the arithmetic mean $fM$, the period duration $t3$ drops with a degree which is equal to the multiple $n$; $t3 = n/f$.

For a frequency $f = n \cdot f0$ the period duration $t3$ is then again T/4. That is, for received frequencies which are a multiple of the fundamental frequency $f0$, the period duration $t3$ is always identical and is $1/f0 = T/4$.

With a percentage-wise equal increase in the received frequencies due to the Doppler effect the period duration $t3$ becomes shorter and with a percentage-wise reduction of the frequencies the period duration $t3$ becomes longer, $t3 = 1/f0(1 \pm D)$.

The limits of unambiguous determination of the Doppler shift D are given by the multiples $n$ and $m$ of the fundamental frequency $f0$. The maximum Doppler shift $D_{max}$ is calculated for the given example for negative Doppler shifts $D2_{max}$ at $D2_{max} = (n-m)/2n$, which corresponds to a period duration $t3 = 1/f0[1-(-n-m)/2n] = n/fM$, for positive Doppler shifts $D3_{max}$ at $D3_{max} = (n-m)/2m$ which corresponds to a period duration $t3 = 1/f0 \ [1+(n-m)/2m] = m/fM$.

The monostable multivibrator 9a is connected to the bandpass filter 9b whose maximum transmission range about the fundamental frequency $f0$ is given by the sum of the positive and negative Doppler shifts $D2_{max}$, $D3_{max}$ which can be unambiguously evaluated. In order to always assure unequivocal determination and recognition of the Doppler shift D, the transmission range is selected to be smaller, i.e., is adapted to the total duration T of the transmitted signals S. With a reduction in the band width at the output of the receiving arrangement compared to the input band width of the receiving arrangement a better ratio of signal to noise output is effected.

Figure 5:
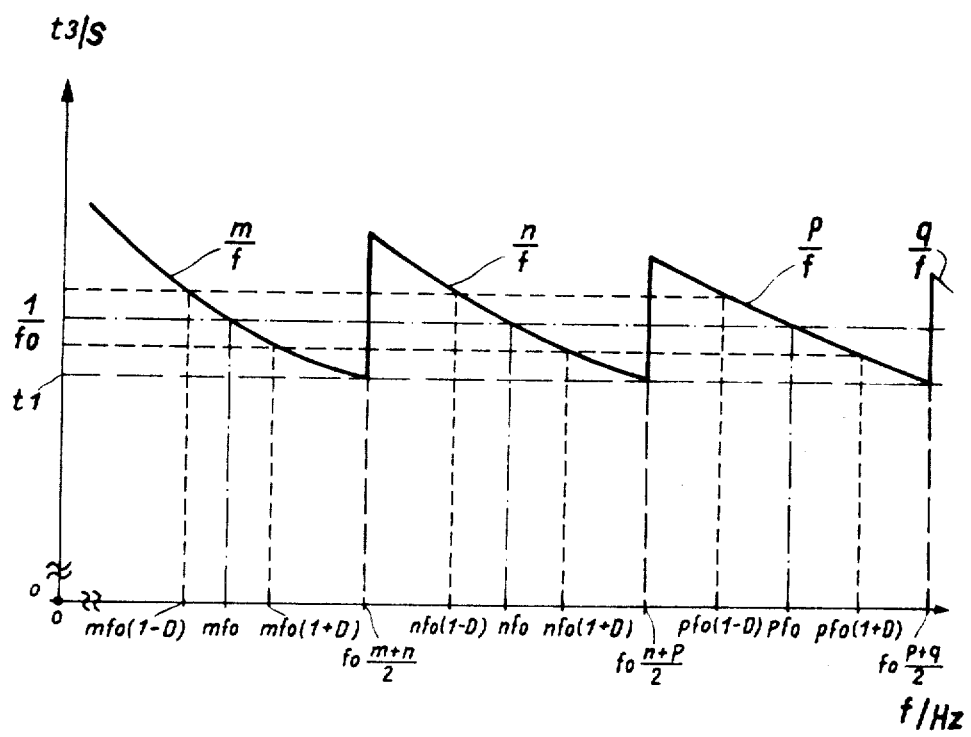
FIG. 5 is a graphical representation of period durations of a signal over a frequency range of interest where any desired code is employed at the transmitting end.

FIG. 5 shows a representation of period durations at the output of a monostable multivibrator over a frequency range of interest when more than two frequencies are used at the transmitting end, i.e., frequencies $m \cdot f0$, $n \cdot f0$, $p \cdot f0$, $q \cdot f0$. The period of dwell of the monostable multivibrator in the astable state is here each time determined by the quotient formed from the multiple $m$ divided by the arithmetic means $fM1$ of the frequencies $m \cdot f0$ and $n \cdot f0$ which is equal to the quotient formed from the multiple $n$ divided by the arithmetic means $fM2$ of frequencies $n \cdot f0$ and $p \cdot f0$, which itself is equal to the quotient formed from the multiple $p$ divided by the arithmetic mean $fM3$ of frequencies $pf0$ and $qf0$. The functional connection between the period duration of the rectangular pulse train at the output of the monostable multivibrator and a frequency which is less than $mf0$ up to frequency $fM1$ is hyperbolic with an incline $m$. At point $fM1$ the period duration $t3$ jumps from value $m/fM1$ to a value $n/fM1$ from where again a hyperbolic sequence of the period duration over the frequency with an incline $n$ can be noted. The next jump occurs at point $fM2$, here the period duration $t3$ jumps from value $t1 = n/fM2$ to the value of the quotient form from $p$ and the arithmetic mean $fM3$. The hyperbolic course of the period duration over the frequency between frequencies $fM2$ and $fM3$ has an incline $p$. If the received signal E has frequencies $mf0$, $nf0$, $pf0$, the period duration is always equal to the reciprocal value of the fundamental frequency $f0$. For negative Doppler shifts the period duration $t3$ increases, for positive Doppler shifts it decreases.

As can be seen in FIG. 5, the frequency divider comprising the monostable multivibrator and a filter connected thereto which is tuned to the fundamental frequency can also advantageously be used for frequency keyed coding elements of transmitted signals which have more than just two multiples of the fundamental frequency.

The received signals can be subjected to a frequency analysis by the jump-type frequency division according to the present invention in the simplest manner because each received signal frequency is reduced to the fundamental frequency plus or minus a frequency component belonging to a possibly present Doppler shift. Since the code employed at the transmitting end and also the multiples used of the fundamental frequency can be varied without any modifications being required at the receiving arrangement and the frequency analyzer, the apparatus of the present invention can be used in a multitude of ways in the entire field of the data transmission art.

It will be understood that the above description of the present invention is susceptible to various modificaitons, changes and adaptations, and the same are intended to be comprehended within the meaning and range of equivalents of the appended claims.

I claim:

1. In a frequency keyed signal system having transmitter means for transmitting signals which have been frequency keyed according to any desirable code and are of a sequence of intervals having substantially identical time durations, the frequencies of the transmitter signals differing from one another and being multiples of a fundamental frequency, and receiving means responsive to the transmitted signals, said receiving means including means for determining Doppler shift, the improvement comprising means forming part of said transmitter means for producing said transmitted signals of different respective frequencies so that said frequencies are whole positive number multiples of said fundamental frequency; wherein said receiving means includes frequency dividing means responsive to the received signals and having a variable dividing ratio for producing on its output an output signal of the fundamental frequency with any Doppler shift as may be present; and wherein said means for determining Doppler shift comprises frequency analyzer means which is tuned to said fundamental frequency and is coupled to the output of said frequency divider means and responsive to its output signal.

2. An arrangement as defined in claim 1 wherein said frequency divider means comprises filter means and monostable multivibrator means, said monostable multivibrator means having a constant period of dwell in its astable state which is shorter than said time duration of the individual intervals of the sequence of transmitted frequency signals and said filter means being coupled to the output of said monostable multivibrator means and responsive to its output signal.

3. Arrangement as defined in claim 2 wherein said monostable multivibrator means has a period of dwell which is equal to the reciprocal value of the arithmetical mean frequency of two adjacent multiples of said fundamental frequency which reciprocal value is multiplied by the smaller one of two adjacent multiples.

4. An arrangement as defined in claim 2 wherein said filter means comprises bandpass filter means whose center frequency is substantially equal to said fundamental frequency, said frequency analyzer means being coupled to the output of said bandpass filter means and responsive to its output signal.

5. An arrangement as defined in claim 4 wherein said frequency analyzer means comprises a filter bank, the output signal from the filter bank being a measure of the Doppler shift.

6. An arrangement as defined in claim 2 wherein said receiving means further includes flip-flop means responsive to the received signals and having its output coupled to the input of said monostable multivibrator means.

* * * * *